United States Patent
Bennett et al.

(10) Patent No.: US 9,765,698 B2
(45) Date of Patent: Sep. 19, 2017

(54) FLEXIBLE BELLOWS IGNITER SEAL

(71) Applicant: Rolls-Royce Corporation, Indianapolis, IN (US)

(72) Inventors: Russell Bennett, Indianapolis, IN (US); Michael S. Bell, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 498 days.

(21) Appl. No.: 14/102,973

(22) Filed: Dec. 11, 2013

(65) Prior Publication Data

US 2014/0352323 A1 Dec. 4, 2014

Related U.S. Application Data

(60) Provisional application No. 61/774,422, filed on Mar. 7, 2013.

(51) Int. Cl.
F02C 7/28 (2006.01)
F02C 7/264 (2006.01)
F02C 7/266 (2006.01)

(52) U.S. Cl.
CPC ............... F02C 7/28 (2013.01); F02C 7/264 (2013.01); F02C 7/266 (2013.01); F05D 2240/55 (2013.01); F05D 2300/501 (2013.01); F23R 2900/00001 (2013.01)

(58) Field of Classification Search
CPC .......... F02K 9/60; F02K 9/95; F05D 2240/55; F23R 2900/00001; F23R 2900/00012; F02C 7/20; F02C 7/264; F02C 7/266; F02C 7/28
See application file for complete search history.

(56) References Cited

U.S. PATENT DOCUMENTS

| 3,048,015 | A | * | 8/1962 | Barrelle | ............... | F02C 7/266 60/39.821 |
|---|---|---|---|---|---|---|
| 3,910,036 | A | | 10/1975 | Irwin | | |
| 4,024,702 | A | | 5/1977 | Hudson | | |
| 4,216,651 | A | | 8/1980 | Ormerod | | |
| 4,275,559 | A | | 6/1981 | Blair | | |
| 4,441,323 | A | | 4/1984 | Colley | | |
| 4,903,476 | A | | 2/1990 | Steber et al. | | |
| 5,402,637 | A | | 4/1995 | Adam | | |
| 5,765,833 | A | | 6/1998 | Able et al. | | |

(Continued)

FOREIGN PATENT DOCUMENTS

| DE | 4340616 A1 | 6/1995 |
|---|---|---|
| GB | 1476414 A | 6/1977 |
| KR | 101265883 B1 | 5/2013 |

OTHER PUBLICATIONS

International Search Report for PCT/US2013/067504 mailed Jan. 3, 2014.

*Primary Examiner* — Arun Goyal
(74) *Attorney, Agent, or Firm* — Fishman Stewart PLLC

(57) ABSTRACT

A flexible bellows assembly is disclosed for sealing an engine igniter for use with an engine. The bellows assembly includes a mounting arrangement that is operable to be secured to a combustor diffuser instead of the combustor liner. The bellows has a component that impinges upon a surface of the combustor liner so as to form a sealed chamber between a metal diffuser and a ceramic combustion liner. An igniter passes through the sealed chamber and provides ignition to the combustor.

15 Claims, 2 Drawing Sheets

(56) References Cited

U.S. PATENT DOCUMENTS

| | | |
|---|---|---|
| 5,794,449 A | 8/1998 | Razdan et al. |
| 5,813,232 A | 9/1998 | Razdan et al. |
| 6,438,940 B1 | 8/2002 | Vacek et al. |
| 6,438,961 B2 | 8/2002 | Tuthill et al. |
| 6,442,929 B1 | 9/2002 | Kraft et al. |
| 6,606,865 B2 * | 8/2003 | Tilson .................... F23R 3/48 60/39.37 |
| 6,715,279 B2 | 4/2004 | White |
| 6,786,046 B2 | 9/2004 | Wiebe et al. |
| 6,920,762 B2 | 7/2005 | Wells et al. |
| 7,946,119 B2 | 5/2011 | Geary |
| 8,171,719 B2 | 5/2012 | Ryan |
| 8,240,151 B2 | 8/2012 | Pelletier et al. |
| 8,662,502 B2 * | 3/2014 | Stoia ...................... F02C 7/22 277/572 |
| 2014/0137567 A1 * | 5/2014 | Park ....................... F02C 3/14 60/796 |

* cited by examiner

FLEXIBLE BELLOWS IGNITER SEAL

CROSS-REFERENCE TO RELATED APPLICATIONS

This application claims priority to U.S. Provisional Patent Application No. 61/774,422, filed Mar. 7, 2013, the contents of which are hereby incorporated in their entirety.

FIELD OF TECHNOLOGY

A gas turbine engine includes a combustor, and more particularly, a combustor with an improved igniter mounting arrangement for use with a combustor employing ceramic tiles.

BACKGROUND

Gas turbine engines use igniters with the combustor to induce combustion within the combustion chamber. A diffuser case circumscribes a combustor liner and an igniter access port is provided which can receive an igniter boss that extends between the diffuser case and the combustor liner. The access port is operable to receive an igniter which extends into the combustion chamber.

A traditional igniter boss can be brazed or welded relative to the combustion liner assembly on the outer wall of the liner. This arrangement allows the igniter boss to be rigidly connected to the combustion liner which traditionally has been constructed of metal. The purpose of the igniter boss is to prevent air from going through the combustor inlet hole while still allowing the igniter to move relative to the combustor. The igniter in turn may be bolted to the outer combustor case which in turn may protrude though a sealing igniter ferrule and towards the combustion liner. Such design provides a somewhat sealed arrangement between the igniter and the combustion liner.

The current trend in the aerospace industry is to utilize lighter weight yet stronger strength materials in various componentry of the gas turbine engine. Use of ceramic materials has been but one method to accomplish this goal and such material is being used with increased frequency to replace traditional metal components in the gas turbine engine. However, the introduction of non-metal components, such as those formed of ceramics, creates yet new engineering problems that need to be solved. For example, fusing metal components to other gas turbine engine ceramic components remains an engineering challenge. Such challenges remain elsewhere in commerce and are not limited to the gas turbine engine industry.

Today the use of ceramics as the primary material source for gas turbine engine combustors offers many benefits. However, combustion liner designs where the liner is made of a non-metallic material, such as ceramics, brazing or otherwise fusing a metal igniter boss assembly to the ceramic liner is not possible. The materials are not compatible and they are not fuseable. As such, an alternate attachment scheme is but one engineering challenge that remains to be solved.

It would be helpful to provide an improved ignition system that overcomes the aforementioned problems. It would also be helpful to provide an improved system of mounting an igniter system to an outer combustor case and then seal against a combustor liner using a flexible bellows assembly.

It would further be helpful to provide a flexible bellows igniter seal assembly that improves sealing between a gas turbine engine diffuser case and an outer combustor liner wall that is in turn made of a ceramic matrix composite (CMC).

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary embodiment includes a flexible bellows assembly for sealing an igniter for use with a gas turbine combustion liner. The bellows assembly may include a mounting member that is operable to be positioned relative to a diffuser. A flexible bellows component extends from the mounting member and impinges upon a surface of the combustor liner so as to form a sealed chamber. An igniter passes through the sealed chamber and provides ignition to the combustor. The disclosure presents an improved sealed arrangement between the metal diffuser and ceramic combustor liner.

Figure 1:
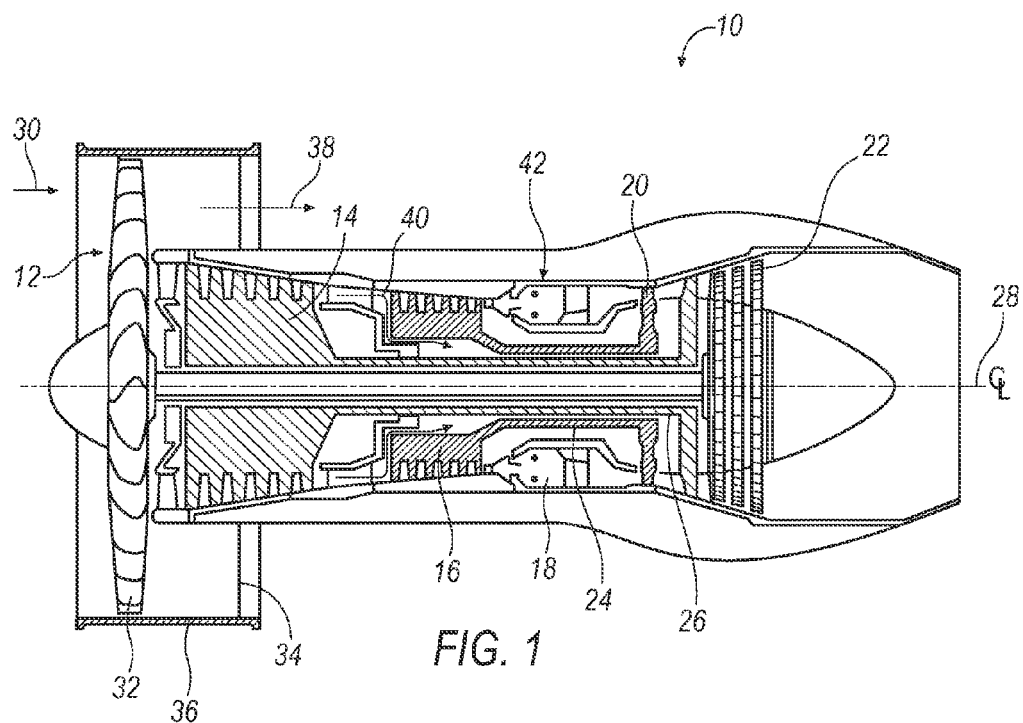
FIG. 1 illustrates a schematic diagram of a gas turbine engine employing an exemplary combustor igniter sealing assembly.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved combustor 18 having a flexible bellow igniter seal assembly 42 for improved sealing between a combustor liner and a diffuser case. It will be appreciated that the flexible bellow igniter seal assembly 42 could be used in other machinery and is not therefor limited to gas turbine engine environments.

Figure 2:
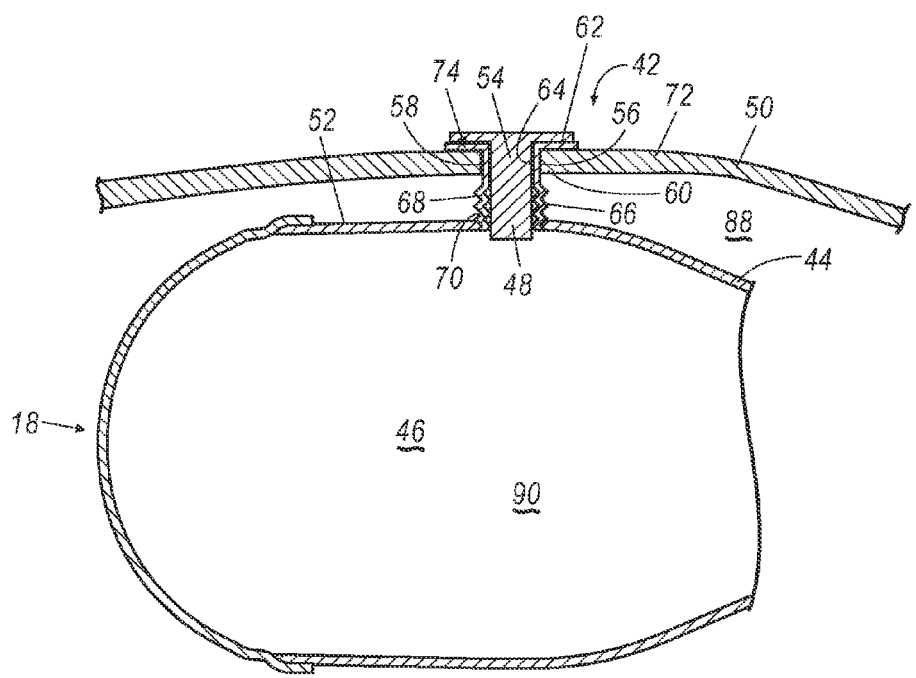
FIG. 2 illustrates an enlarged side sectional view of a combustor assembly, showing a bellows assembly installed.

FIG. 2 illustrates a simplified side sectional view of a combustor 18 and a flexible bellow igniter seal assembly 42. The combustor 18 has a combustor liner 44 with an internal plenum 46. An igniter tube opening 48 is operable to receive an igniter assembly (see FIG. 4). A diffuser case 50 is spaced apart from an outer surface 52 of the combustor liner 44. The diffuser case 50 may be constructed from metal while the outer surface 52 of the combustor liner 44 may be made of non-metalic material, such, but not limited to, ceramic composite materials.

The diffuser case 50 has an opening 54 for receiving the flexible bellow igniter seal assembly 42 and an igniter 74. The flexible bellows igniter seal assembly 42 attaches to the diffuser case 50 instead of the combustion liner 44. The flexible bellows igniter seal assembly 42 is positioned within the opening 54 and creates a seal 56 between an outer periphery 58 of the seal assembly 42 and an end point 60 of the opening of the liner opening 54.

The flexible bellows igniter seal assembly 42 includes a radially extending flange portion 62, a downwardly extending portion 64, and a bellows member 66. The flange 62, downward portion 64, and bellows member 66 may be unitary and formed of a high temperature resistant material. The bellows member 66 has an accordion like extended portion 68 and an endpoint 70 that mates up against outer surface 52 of the liner 44. The bellows member 66 is made of resilient material and provides a downward biasing force which in turn causes the endpoint 70 to impinge upon the outer surface 52. The bellows assembly 42 may be temporarily or permanently secured to the outer surface 72 of the diffuser case liner 50 by fastening or other means. The assembly 42 provides a structure that provides a seal between the igniter 74 and a non-metallic liner, such as liner 44. This provides a seal between a metal structure, i.e., the bellow assembly, and a non-analogous structure, such as a ceramic combustor line 44.

The flexible bellows igniter seal assembly 42 can be fabricated from a sheet metal construction to ensure flexibility through thermal growth and deflection of the liner 44, diffuser case 50, and igniter 74 during operation. The seal assembly 42 can be manufactured through sheet metal forming and rolling.

Figure 3:
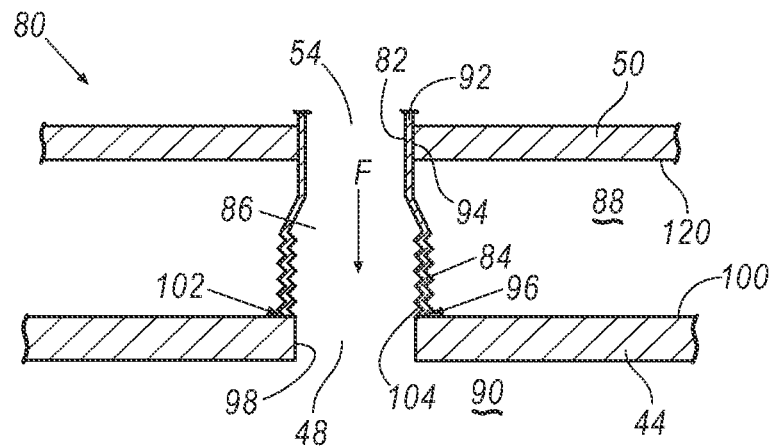
FIG. 3 illustrates an enlarged partial side sectional view of the FIG. 2 combustor, showing an exemplary bellows assembly.

With reference to FIG. 3, an alternative flexible bellows igniter assembly 80 is disclosed having a one-piece design. It will be appreciated that the assembly 80 could be constructed of multi components. A first annular portion 82 and a corrugated bellows structure 84 form a sealed chamber 86 that extends between the diffuser case 50 and the combustion liner 44. The chamber 86 separates a high pressure area 88 from a low pressure area 90. The low pressure area 90 is defined by the internal plenum 46 that is created by the combustor liner 44.

The diffuser case 50 has an opening 54 and the combustion liner 44 has a second opening 48. The flexible bellows 80 is attached at its upper end 92 to a bore 94 of the diffuser case 50. The lower end 96 of the flexible bellows assembly 80 is secured to an upper surface 100 of the combustion liner 44 near the second opening 98. A barrier coat 102 may be provided near the connection 104 where the lower end 96 of the bellows structure 84 mates with the upper surface 100 of the combustion liner 44.

Figure 4:
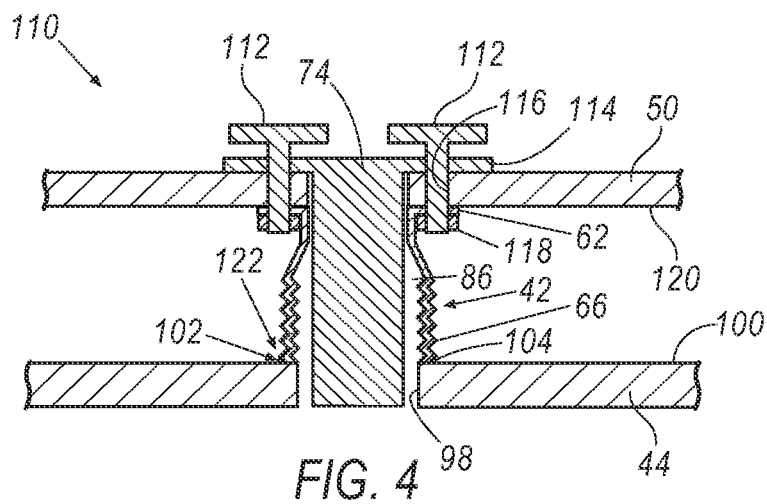
FIG. 4 illustrates an enlarged partial side sectional view of the FIG. 2 combustor, showing an alternative bellows assembly.

FIG. 4 illustrates another alternative flexible bellows igniter system 110 that employs at least one fastener 112 to secure the igniter 74, the diffuser 50, and the bellows assembly 42 together. The fastener 112 passes through an upper flange 114 of the igniter 74, an aperture 116 in the diffuser 50, and the L-shaped flange 62 of the igniter bellows assembly 42. A retainer member such as a nut 118 can be tighten against the underside of the flange 62 so as to force the flange 62 against the surface 120 of the diffuser 50. The end 96 of the bellows structure 84 engages the upper surface 100 of the combustor liner 44. A sealant or coating provides a barrier coating 102 that may be applied at the connection 104 to form a seal 122 between the bellows structure 66 and the liner 44. The coating 102 may be applied on the top surface 100 of the liner 44, which may be constructed of ceramic material, and the coating 102 may extend around the entire circumference of the bellows structure 66 or it may be applied locally. The coating 102 may be made of material that is compatible with ceramics.

For assembly of the structure that is shown in FIG. 4, the bellows assembly 42 may be installed in position before the igniter 74 is located into position. The igniter 74 may then be passed through the inner chamber 86 that is formed in part by the bellows assembly 42. Fasteners 112 are then installed by passing same through the holes in the igniter 74, diffuser case 50, and then flange 62. When the fasteners 112 are tightened the bellows assembly 42 will seal against the surface 120. The bellows 66 will flex and seal against the outer wall 100 of the combustion liner 44. After the bellows assembly 42 has been secured in place, an environmental barrier coat 102 may be sprayed onto the bellows (either TBC or a thermal wear coating). This barrier coat 102 reduces wear between the bellows and the liner which may be constructed of different material. It will be appreciated that other wear resistant material may be used so as to reduce wear between the bellows and the liner.

Figure 5:
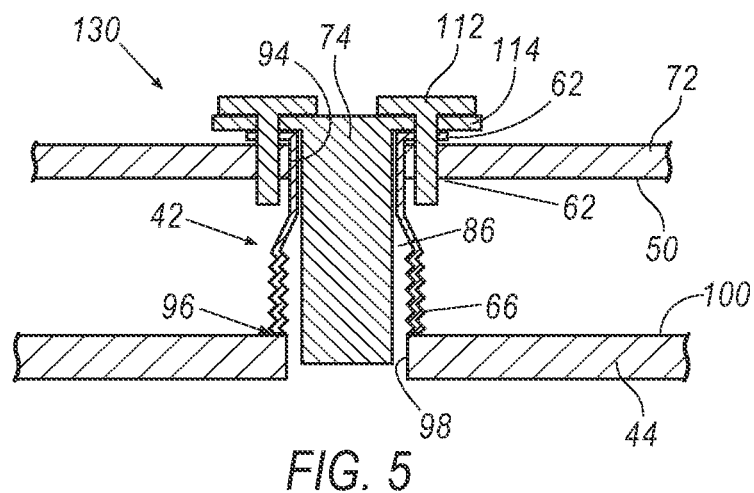
FIG. 5 illustrates an enlarged partial sectional view of the FIG. 2 combustor, showing another alternative bellows assembly.

FIG. 5 illustrates an alternative flexible bellows igniter seal assembly 130 that employs a bellows assembly 42 having a L-shaped mounting member or flange 62 that is disposed between the flange 114 of the igniter 74 housing and the upper surface 72 of the diffuser case 50. A fastener 112 passes through the flange 114 of the igniter 74, the L-shaped flange 62 of the bellows assembly 42 and then is secured to the diffuser case 50. A nut 118 (not shown) may be used along with the fastener 112 or the fastener 112 may be treaded directly to a tapped bore of the diffuser 50.

To assemble the structure that is shown in FIG. 5, the bellows assembly 42 may first be inserted into bore 94 of the diffuser 50. The flange 62 mates tightly against the bore 94 to create a seal therebetween. Next the igniter 74 is slid into the chamber 86 which is circumscribed by the bellows assembly 42. The fastener 112 is then secured in place which causes the bearing surface of the fastener 112 to bear down against the flange 114 of the igniter 74 and in turn impinge upon the flange 62 of the bellows assembly 42. As torque is applied to the fastener 112 the flange 62 is compressed and sandwiched between the surface 72 and flange 114. The bellow 66 is sufficiently rigid in the axial direction such that as the fastener 112 bears down, the lower end 96 of the bellows engages the upper surface 100 of the liner 44.

The bellows assembly 42 may also be permanently secured to the diffuser 50 using various methods. Conversely, the bellows assembly 42 may be repaired by replacing it with a new assembly in the event the bellows 66 wears to an undesirable condition.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine comprising:
an igniter having a top flange;
a diffuser case having a first opening;
a combustor liner having a second opening;
a flexible bellows seal having a first end and a second end opposite of the first end, and a flange at the first end;
a fastener to secure the flexible bellows seal to an inner surface of the diffuser case via the flange of the flexible bellows seal, and the igniter to an outer surface of the diffuser case via the top flange of the igniter; and
a coating applied on a too surface of the combustor liner and extending around a circumference of the flexible bellows seal;
wherein the igniter extends into an interior of the flexible bellows seal through the first opening and aligned with the second opening; and
wherein the second end of the flexible bellows seal is in contact with the coating.

2. The gas turbine engine as claimed in claim 1, wherein the coating is located between the flexible bellows seal and the combustor liner.

3. The gas turbine engine as claimed in claim 1, wherein the flexible bellows seal has a first member that engages the diffuser case, and a second member that has a flexible portion that is operable to compress and expand under certain conditions.

4. The gas turbine engine as claimed in claim 1, wherein the flexible bellows seal further includes an elongated portion and a bellows structure.

5. The gas turbine engine as claimed in claim 1, wherein the top flange of the igniter is configured to rest against a substantially flat surface of the diffuser case.

6. The gas turbine engine as claimed in claim 1, further comprising a sealed chamber that is sized to receive the igniter.

7. The gas turbine engine as claimed in claim 6, wherein the chamber is defined by the flexible bellows seal.

8. The gas turbine engine as claimed in claim 1, wherein the combustor liner is constructed of ceramic material.

9. The gas turbine engine as claimed in claim 8, wherein the coating is compatible with the ceramic material of the combustor liner.

10. The gas turbine engine as claimed in claim 1, wherein the flexible bellows seal is constructed of non-ceramic material.

11. The gas turbine engine as claimed in claim 1, wherein the flexible bellows seal includes a fixed portion and a flexible portion, the fixed portion is removably secured to the diffuser case.

12. The gas turbine engine as claimed in claim 1, wherein the flexible bellows seal is formed of metal.

13. The gas turbine engine as claimed in claim 1, wherein the flexible bellows seal further includes a flange, an annular portion and a corrugated flexible portion.

14. The gas turbine engine as claimed in claim 1, wherein the flexible bellows seal is constructed of metal, and the combustor liner is constructed of a ceramic material.

15. The gas turbine engine as claimed in claim 1, wherein the fastener passes through the flange of the igniter, an aperture in the diffuser, and the flange of the flexible bellows seal to secure the flexible bellows seal to the inner surface of the diffuser case, and the igniter to the outer surface of the diffuser case.

* * * * *